PAUL KORWIN
INVENTOR.

United States Patent Office 3,450,504
Patented June 17, 1969

3,450,504
GAS BURNER
Paul Korwin, Flushing, N.Y., assignor to Chemical Construction Corporation, New York, N.Y., a corporation of Delaware
Filed Oct. 11, 1965, Ser. No. 494,792
Int. Cl. B01j 1/14; C01b 2/14
U.S. Cl. 23—277
9 Claims

ABSTRACT OF THE DISCLOSURE

An improved gas burner for the combustion of a hot gaseous hydrocarbon-containing process stream with air is provided, in which the apparatus includes the combination of inner and outer coaxial conduits, a refractory sleeve which extends into the combustion chamber from the end of the outer conduit, and a conical baffle which is disposed at the outlet of the inner conduit and provided with external vanes. The inner conduit extends into the combustion chamber beyond the end of the outer conduit. The combustion air stream is preferably passed inwards through the inner conduit, and the hot process gas stream is passed inwards through the annular passage between the inner and outer conduits. A whirling component of flow direction is imparted to the air stream passing outwards through the annular opening between the end of the inner conduit and the conical baffle by the vanes, and the reacting mixture of air and process gas impinges on the refractory sleeve in the combustion chamber. A third conduit is preferably provided coaxial with and external to the outer conduit, together with a lining of refractory material in the annular space between the outer conduit and the third conduit.

---

Figure 1:
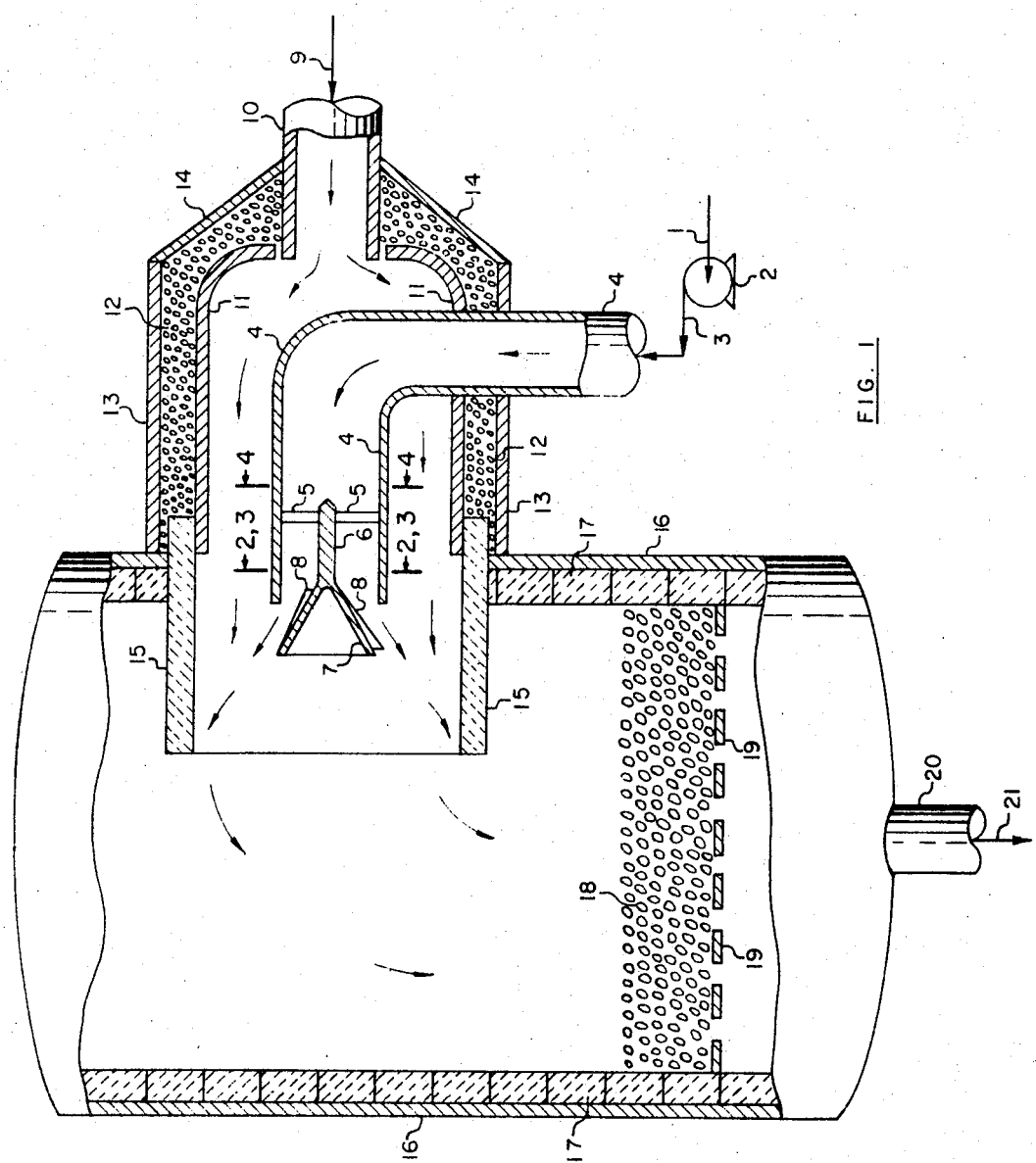

The present invention relates to an improved gas burner for reacting a hydrocarbon-containing gas stream with air. An apparatus is provided which attains rapid and complete mixing of the gas stream with air, which results in rapid and concentrated combustion, followed by impingement of the high temperature reacting gas mixture on a refractory surface, thus attaining uniform and complete combustion and mixing while sustaining the combustion reaction regardless of process stream surges or fluctuations.

Numerous types of apparatus have been suggested for employment as gas burners which serve to rapidly mix a hydrocarbon-containing gas stream with air thus attaining rapid and uniform combustion. In many cases, the gas stream is projected outwards into the concurrently flowing air stream, and the resulting reacting gaseous mixture then flows into a combustion chamber. Typical gas burner apparatus assemblages are shown in U.S. Patents Nos. 3,174,531; 2,855,033; 2,497,321; 2,377,497; 1,844,151; 1,561,848 and 1,340,902. In numerous prior art devices, various difficulties have been encountered in practice, such as incomplete or uneven mixing of the gas and air streams, channeling or incomplete combustion leading to carbon deposition, and interruptions of the combustion reaction due to process surges and fluctuations or changes in process operating conditions. One of the major prior art problems has been the attainment of uniform mixing and complete combustion of gas flowing at a large volumetric rate by means of a single apparatus unit. A typical example of this situation occurs in the catalytic reforming of fluid hydrocarbons to produce ammonia synthesis gas. In this well-known process sequence, a gaseous mixture of hydrocarbon and steam is passed through the externally heated and catalyst-filled tubes of a primary reformer, to produce a crude partially reformed synthesis gas containing unreacted gaseous hydrocarbon, hydrogen, carbon monoxide and steam. The crude synthesis gas is produced at a highly elevated temperature, typically about 850° C., and is then passed to a secondary reformer for further catalytic conversion of its hydrocarbon content. The secondary reformer consists of a vessel provided with a bed of catalyst particles. The crude partially reformed synthesis gas stream is mixed with a process air stream at one end of the vessel, and an immediate combustion reaction takes place between the oxygen content of the air stream and components in the crude synthesis gas, which raises the overall gas stream temperature. The resultant mixed gas stream then passes through the catalyst bed at a highly elevated temperature, and is removed from the secondary reformer vessel. A rapid, complete and uniform reaction of the crude synthesis gas stream with the process air stream is required, prior to passage of the mixed gas stream into the catalyst bed, in order to avoid carbon deposition and to attain uniform catalytic reaction regardless of process stream surges or fluctuations.

In the present invention, a unitary gas burner apparatus assemblage is provided for reacting a hydrocarbon-containing gas stream with air. The gas burner of the present invention is highly useful under conditions of large gas volume and possible fluctuations in the volumetric rate of stream flow, as in the case of a secondary reformer described supra. The apparatus of the present invention includes two coaxial concentric conduits which extend into a combustion chamber, with the inner conduit extending beyond the end of the outer conduit. The process air stream is passed into the combustion chamber through the inner conduit, and the hydrocarbon-containing gas stream flows into the chamber through the annular passage between the inner and outer conduits. A generally wedge-shaped or conical baffle is coaxially positioned at the outlet end of the inner conduit, with its apex within the inner conduit and its base external to the inner conduit. Thus, the process air stream flowing out of the inner conduit is projected outwards into rapid and complete mixture with the hydrocarbon-containing gas stream. In addition, a hollow refractory sleeve is provided which extends into the combustion chamber from the end of the outer conduit and is generally coaxial with the outer conduit. The reacting mixture of hydrocarbon-containing gas and air impinges on the inner surface of the refractory sleeve, and heats this surface to a highly elevated temperature. The process combustion reaction thus is carried out rapidly and completely, with the attainment of process equilibrium without the deposition of free carbon. In the secondary reforming of a crude partially reformed synthesis gas mixture, the combustion chamber is at one end or part of the secondary reform vessel, and the reacted gas mixture from the burner passes through the catalyst vessel and is catalytically further reformed, and is then removed from the vessel.

The apparatus of the present invention provides several important advantages. A single, unitary apparatus assemblage is provided which is capable of attaining rapid and complete combustion of a hydrocarbon-containing gas stream, without the deposition of free carbon. This is particularly important in the case of secondary reforming described supra, since the proportion of process air which is provided is substantially below the stoichiometric requirement for complete combustion of the gas stream. Thus, the reacting gas mixture may readily deposit free carbon, unless uniform reaction conditions are attained. In addition, the gas burner of the present invention has a large capacity in a single unit, and is capable of handling large flow rates of the reacting streams while providing rapid and complete mixing and reaction. Another important advantage of the present invention is due to the provision of the refractory sleeve, which is heated in most cases to incandescence or red heat by the impinging and reacting gas mixture. It has been determined that the provision of the refractory sleeve surface at high temperature serves to promote the speed of reaction and thus assures completion of the reaction. In addition, the hot refractory surface assures uniform and complete reaction regardless of surges, fluctuations or changes in process stream flow rates. In effect, the refractory sleeve when at elevated temperature serves to actually catalyze the combustion reaction and produces faster reaction rates.

It is an object of the present invention to provide an improved gas burner for reacting a hydrocarbon-containing gas stream with air.

Another object is to provide a gas burner which promotes a rapid and complete reaction during combustion of a hydrocarbon-containing gas stream.

A further object is to provide a gas burner which attains rapid and uniform mixing of a hydrocarbon-containing gas stream with air.

An additional object is to provide a gas burner which sustains a uniform and complete reaction of a hydrocarbon-containing gas stream with air, without carbon deposition and regardless of process surges or fluctuation in flow rates of the process streams.

Still another object is to provide a gas burner for the reaction of a hydrocarbon-containing gas stream with air which provides an integral refractory surface on which the reacting gas mixture is impinged.

Still a further object is to provide an improved gas burner for a secondary reformer in which a crude partially reformed synthesis gas stream is reacted with air and the resultant reacted gas mixture is catalytically reformed.

Figure 2:
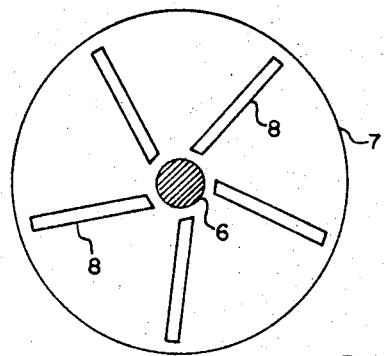
Figure 3:
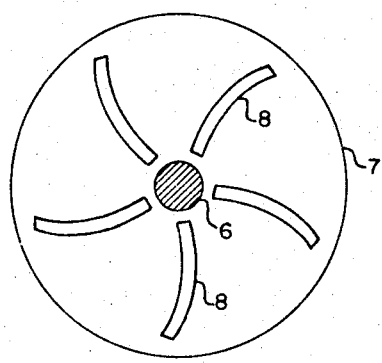
Figure 4:
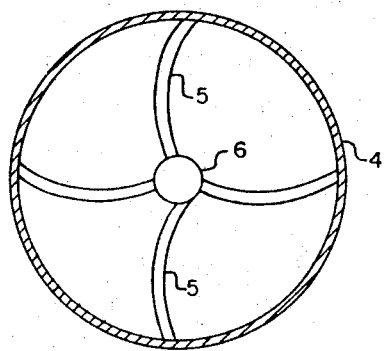

These and other objects and advantages of the present invention will become evident from the description which follows. Referring to the figures, FIGURE 1 provides a sectional elevation view of a preferred embodiment of the gas burner of the present invention, as applied to the reaction of crude partially reformed synthesis gas with air in a secondary reformer, FIGURE 2 is a sectional elevation view of the baffle and whirl vanes arrangement of FIGURE 1, taken on section 2—2, FIGURE 3 is another sectional elevation view of a portion of FIGURE 1, taken on section 3—3 and showing an alternative arrangement of the baffle and whirl vanes, and FIGURE 4 is a sectional elevation view of FIGURE 1, taken on section 4—4 and showing a preferred arrangement of the support straps.

Referring now to FIGURE 1, the process air stream 1 is passed via blower 2 as stream 3 into conduit 4. The air stream passes into the horizontal section of conduit 4, and flows between support straps 5. The straps 5 extend between the inner surface of conduit 4 and the stem 6, and serve to support the funnel-shaped air deflection baffle having the stem 6 and conical section 7. The baffle consisting of stem 6 and section 7 is coaxially positioned within conduit 4, with the apex of section 7 within conduit 4 and the base of section 7 being external to conduit 4. A plurality of whirl vanes 8 are preferably provided on the outer surface of section 7, and serve to impart a whirling circular motion to the air stream being discharged outwardly from between the end of conduit 4 and section 7.

The hydrocarbon-containing gas stream 9 in this preferred embodiment of the present invention consists of a crude partially reformed synthesis gas stream derived from the primary steam reforming of a fluid hydrocarbon such as methane or naphtha, and principally containing unconverted hydrocarbon, hydrogen, carbon monoxide and steam. Stream 9 is passed into the burner apparatus from the primary reformer via conduit 10, which discharges the gas stream into conduit 11. Stream 9 is at a highly elevated temperature, and in order to avoid stress due to differential thermal expansion the adjacent ends of conduits 11 and 10 are juxtaposed with a clearance spacing. In addition, in most cases a lining 12 consisting of refractory packing is disposed external to conduit 11. The refractory lining 12 is retained by means of structural enclosure such as outer conduit 13, which is coaxial with conduit 11, and frusto-conical baffle 14. The hot gas stream 9 flows into conduit 11, which is coaxial with and concentrically external to conduit 4, and passes into the annular space between conduit 4 and conduit 11.

The hot gas stream next contacts the process air stream 3 which is outwardly discharging from conduit 4, and a combustion reaction takes place between the oxygen content of the air and components in the gas stream 9. The reacting gas mixture follows a conical outwards flow path due to the motion imparted to the air stream by conical section 7, and impinges on the cylindrical refractory sleeve 15 which is coaxial with conduit 11 and extends inwards from the end of conduit 11 and beyond the end of conduit 4. As discussed supra, the inner surface of sleeve 15 thus attains a highly elevated temperature and may become incandescent. As a result, the reaction between streams 3 and 9 is essentially catalyzed by the provision of sleeve 15, and a rapid complete reaction is attained regardless of process surges or fluctuations in the flow rates of streams 3 and 9.

The resulting gas mixture flows into the upper section or combustion chamber portion of vessel 16, which is generally vertically oriented and provided with an inner refractory brick lining 17. The hot gas mixture next passes downwards through catalyst bed 18 which is supported on grid 19, and catalytic steam reforming of residual hydrocarbon in the gas mixture takes place in bed 18, which typically consists of activated nickel or cobalt deposited on a suitable carrier. The resulting fully reformed synthesis gas mixture is discharged from the lower part of vessel 16 via conduit 20 as stream 21, and is passed to further processing, not shown.

FIGURE 2, taken on section 2—2 of FIGURE 1, illustrates a typical arrangement of the whirl vanes 8, which are disposed on the outer surface of the conical section 7 at an angle relative to radial lines drawn from the apex of conical section 7 to the circumference of the base of section 7.

FIGURE 3, taken on section 3—3 of FIGURE 1, illustrates an alternative arrangement of the whirl vanes 8, which are curved so as to more effectively project the air stream into a whirling circular path, as the air stream flows outwards through the annular opening between conical section 7 and the end of conduit 4.

FIGURE 4, taken on section 4—4 of FIGURE 1, shows a preferred arrangement of the support straps 5, which are curved so as to compensate for stress which could be caused by outward thermal expansion of conduit 4 relative to stem 6 under service conditions of elevated temperature.

Numerous alternatives within the scope of the present invention will occur to those skilled in the art. The gas burner apparatus of the present invention is generally applicable to the combustion or reaction of any gaseous or vaporized liquid hydrocarbon with air, or to the reaction of any hydrocarbon-containing gas stream with air. The conduits 4 and 11 and the sleeve 15 have been described as being cylindrical, however alternative configurations may be adopted for these units in practice, such as a square or rectangular cross-section. In such cases, the section 7 would be essentially wedge-shaped, in order to project the process air stream outwards. In some instances the whirl vanes 8 may be omitted, and the air stream projected outwards without a whirling circular motion. However, it is evident that the provision of the vanes 8 is preferable in most instances, in order to promote rapid and uniform mixing of the air stream 3 with the hydrocarbon-containing gas stream 9. The stem 6 may also be omitted in some cases, and conical baffle section 7 would then be directly supported or suspended coaxially within conduit 4 by suitable structure such as straps 5. In cases where the hydrocarbon-containing gas stream 9 is at reduced or ambient temperature, the refractory lining 12 and supporting structure 13 and 14 may be omitted, and the end of conduit 10 will be directly connected to the end of conduit 11 by fluid-impervious attachment.

The gas burner apparatus of the present invention as applied to secondary reforming may be provided below the catalyst bed, in which case the gas mixture discharged from the gas burner will rise through the catalyst bed to an upper outlet. In some instances it may also be feasible to pass the gas mixture horizontally through the catalyst bed.

Another alternative embodiment within the scope of the present invention will occur to those skilled in the art. This modification consists of passing air stream 3 through conduit 10 and into the annular passage between conduits 4 and 11, with the passage of the hydrocarbon-containing gas stream 9 through conduit 4 for outwards projection into the air stream and subsequent impingement on sleeve 15. The functional equivalence of the co-acting apparatus combination of the present invention will be identical in this variation of the invention.

I claim:

1. A gas burner for reacting a hydrocarbon-containing gas stream with air which comprises a combustion chamber, a first conduit, said first conduit extending into said chamber, means to pass an air stream through said first conduit, a wedge-shaped baffle, said baffle being coaxially disposed at the outlet end of said first conduit and spaced away from said first conduit, the apex of said baffle being within said first conduit and the base of said baffle being external to said first conduit, a plurality of vanes disposed on the outer surface of said baffle, whereby a whirling component of flow direction is imparted to the air stream passing outwards through the annular opening between the end of said first conduit and said baffle, a second conduit, said second conduit being coaxial with and external to at least a portion of said first conduit, said first conduit extending beyond the inner end of said second conduit, means to pass a hydrocarbon-containing gas stream through the annular passage between said first conduit and said second conduit, a sleeve composed of refractory material, said sleeve being coaxial with said second conduit and extending from the end of said second conduit into said chamber beyond the end of said first conduit, whereby said air stream is projected outwards by said baffle with a whirling motion imparted by said vanes and into said hydrocarbon-containing gas stream and the resultant reacting gas mixture impinges upon said sleeve, and means to remove the reacted gas mixture from said combustion chamber.

2. A gas burner for reacting a hydrocarbon-containing gas stream with air which comprises a combustion chamber, a first cylindrical conduit, said first conduit extending into said chamber, means to pass an air stream through said first conduit, a conical baffle, said baffle being coaxially disposed at the outlet end of said first conduit and spaced away from said first conduit, the apex of said baffle being within said first conduit and the base of said baffle being external to said first conduit, a plurality of vanes disposed on the outer surface of said baffle, whereby a whirling component of flow direction is imparted to the air stream passing outwards through the annular opening between the end of said first conduit and said baffle, a second cylindrical conduit, said second conduit being coaxial with and concentrically disposed external to at least a portion of said first conduit, said first conduit extending beyond the inner end of said second conduit, means to pass a hydrocarbon-containing gas stream through the annular passage between said first conduit and said second conduit, a cylindrical sleeve composed of refractory material, said sleeve being coaxial with said second conduit and extending from the end of said second conduit into said chamber beyond the end of said first conduit, whereby said air stream is projected outwards by said baffle with a whirling motion imparted by said vanes and into said hydrocarbon-containing gas stream and the resultant reacting gas mixture impinges upon said sleeve, and means to remove the reacted gas mixture from said combustion chamber.

3. A gas burner for reacting a hot hydrocarbon-containing gas stream with air which comprises a combustion chamber, a first cylindrical conduit, said first conduit extending into said chamber, means to pass an air stream through said first conduit, a funnel-shaped baffle having a conical section and a stem extending from the apex of said conical section, said baffle being coaxially disposed at the outlet end of said first conduit and spaced away from said first conduit, the stem of said baffle being coaxially aligned within said first conduit and the base of said conical section being external to said first conduit, a plurality of straps, each of said straps extending between the stem of said baffle and said first conduit and thereby supporting said baffle at the outlet end of said first conduit, a second cylindrical conduit, said second conduit being coaxial with and concentrically disposed external to at least a portion of said first conduit, said first conduit extending beyond the inner end of said second conduit, a third cylindrical conduit, said third conduit being coaxial with and concentrically disposed external to said second conduit, a lining of refractory material disposed in the annular space between said second conduit and said third conduit, means to pass a hydrocarbon-containing gas stream through the annular passage between said first conduit and said second conduit, a cylindrical sleeve composed of refractory material, said sleeve being coaxial with said second conduit and extending from the end of said second conduit into said chamber beyond the end of said first conduit, whereby said air stream is projected outwards by the conical section of said baffle into said hydrocarbon-containing gas stream and the resultant reacting gas mixture impinges upon said sleeve, and means to remove the reacted gas mixture from said combustion chamber.

4. The apparatus of claim 3, in which said straps are curved, whereby stress of said straps due to thermal expansion of said first conduit is reduced.

5. A gas burner for reacting a hot hydrocarbon-containing gas stream with air which comprises a combustion chamber, a first cylindrical conduit, said first conduit extending into said chamber, means to pass an air stream through said first conduit, a conical baffle, said baffle being coaxially disposed at the outlet end of said first conduit and spaced away from said first conduit, the apex of said baffle being within said first conduit and the base of said baffle being external to said first conduit, a plurality of vanes disposed on the outer surface of said baffle, whereby a whirling component of flow direction is imparted to the air stream passing outwards through the annular opening between the end of said first conduit and said baffle, a second cylindrical conduit, said second conduit being coaxial with and concentrically disposed external to at least a portion of said first conduit, said first conduit extending beyond the inner end of said second conduit, a third cylindrical conduit, said third conduit being coaxial with and concentrically disposed external to said second conduit, a lining of refractory material disposed in the annular space between said second conduit and said third conduit, means to pass a hydrocarbon-containing gas stream through the annular passage between said first conduit and said second conduit, a cylindrical sleeve composed of refractory material, said sleeve being coaxial with said second conduit and extending from the end of said second conduit into said chamber beyond the end of said first conduit, whereby said air stream is projected outwards by said baffle with a whirling motion imparted by said vanes and into said hydrocarbon-containing gas stream, and the resultant reacting gas mixture impinges upon said sleeve, and means to remove the reacted gas mixture from said combustion chamber.

6. The apparatus of claim 5, in which said vanes are curved.

7. A gas burner for reacting a hot hydrocarbon-containing gas stream with air which comprises a combustion chamber, a first cylindrical conduit, said first conduit extending into said chamber, means to pass an air stream through said first conduit, a funnel-shaped baffle having a conical section and a stem extending from the apex of said conical section, said baffle being coaxially disposed at the outlet end of said first conduit and spaced away from said first conduit, the stem of said baffle being coaxially aligned within said first conduit and the base of said conical section being external to said first conduit, a plurality of vanes disposed on the outer surface of the conical section of said baffle, whereby a whirling component of flow direction is imparted to the air stream passing outwards through the annular opening between the end of said first conduit and said baffle, a plurality of straps, each of said straps extending between the stem of said baffle and said first conduit and thereby supporting said baffle at the outlet end of said first conduit, a second cylindrical conduit, said second conduit being coaxial with and concentrically disposed external to at least a portion of said first conduit, said first conduit extending beyond the inner end of said second conduit, a third cylindrical conduit, said third conduit being coaxial with and concentrically disposed external to said second conduit, a lining of refractory material disposed in the annular space between said second conduit and said third conduit, means to pass a hydrocarbon-containing gas stream through the annular passage between said first conduit and said second conduit, a cylindrical sleeve composed of refractory material, said sleeve being coaxial with said second conduit and extending from the end of said second conduit into said chamber beyond the end of said first conduit, whereby said air stream is projected outwards by the conical section of said baffle with a whirling motion imparted by said vanes and into said hydrocarbon-containing gas stream and the resultant reacting gas mixture impinges upon said sleeve, and means to remove the reacted gas mixture from said combustion chamber.

8. The apparatus of claim 7, in which said vanes are curved.

9. The apparatus of claim 7, in which said straps are curved, whereby stress of said straps due to thermal expansion of said first conduit is reduced.

References Cited

UNITED STATES PATENTS

| 1,791,011 | 2/1931 | Paulsen | 158—110 |
| 2,561,793 | 7/1951 | Furczyk | 158—99 |
| 3,190,730 | 6/1965 | Korwin et al. | 23—288 |
| 3,262,758 | 7/1966 | James et al. | 23—288 |

JOSEPH SCOVRONEK, *Primary Examiner.*

U.S. Cl. X.R.

23—288; 431—183